(12) United States Patent
Götz

(10) Patent No.: US 10,344,823 B2
(45) Date of Patent: Jul. 9, 2019

(54) PLATE-LINK CHAIN

(71) Applicant: SCHAEFFLER TECHNOLOGIES AG & CO. KG, Herzogenaurach (DE)

(72) Inventor: Andreas Götz, Rastatt (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 9 days.

(21) Appl. No.: 14/647,327

(22) PCT Filed: Nov. 21, 2013

(86) PCT No.: PCT/DE2013/200316
§ 371 (c)(1),
(2) Date: May 26, 2015

(87) PCT Pub. No.: WO2014/090241
PCT Pub. Date: Jun. 19, 2014

(65) Prior Publication Data
US 2015/0300450 A1    Oct. 22, 2015

(30) Foreign Application Priority Data

Dec. 12, 2012   (DE) .................. 10 2012 222 833

(51) Int. Cl.
*F16G 5/18*        (2006.01)
(52) U.S. Cl.
CPC ...................... *F16G 5/18* (2013.01)
(58) Field of Classification Search
CPC ........................................................ F16G 5/18
See application file for complete search history.

(56) References Cited

U.S. PATENT DOCUMENTS

| | | | | |
|---|---|---|---|---|
| 3,742,776 A | * | 7/1973 | Avramidis | ............. F16G 13/04 474/215 |
| 4,010,656 A | * | 3/1977 | Jeffrey | .................... F16G 13/06 474/215 |
| 4,581,001 A | * | 4/1986 | Rattunde | ................... F16H 9/24 474/214 |
| 4,618,338 A | | 10/1986 | Rattunde et al. | |
| 4,898,568 A | | 2/1990 | Sakakibara et al. | |

(Continued)

FOREIGN PATENT DOCUMENTS

| | | |
|---|---|---|
| CN | 101069032 A | 11/2007 |
| DE | 34 13 384 A1 | 10/1985 |

(Continued)

OTHER PUBLICATIONS

International Search Report, dated May 13, 2014, issued by the ISA/EPO in Application No. PCT/DE2013/200316.

(Continued)

*Primary Examiner* — Minh Truong
(74) *Attorney, Agent, or Firm* — Kevin L. Parks

(57) ABSTRACT

A plate-link chain, in particular for a continuously variable transmission of a motor vehicle, having plate links which are connected to each other in an articulated manner by pairs of rocker pressure members, each including two rocker pressure members. The plate links and the rocker pressure members are designed in such a way as to bear against each other at respective flat contact surfaces so that the load on plate-link bands of the plate links is nearly torque-free during operation of the plate-link chain.

15 Claims, 1 Drawing Sheet

(56) References Cited

U.S. PATENT DOCUMENTS

| | | | | |
|---|---|---|---|---|
| 5,242,333 | A * | 9/1993 | Sugimoto | F16G 5/18 474/212 |
| 5,651,746 | A * | 7/1997 | Okuda | F16G 13/04 474/215 |
| 6,277,046 | B1 * | 8/2001 | Ohara | F16G 13/04 474/215 |
| 6,824,484 | B2 * | 11/2004 | Greiter | B21L 15/005 474/201 |
| 7,658,690 | B2 * | 2/2010 | Pichura | F16G 5/18 474/206 |
| 7,976,418 | B2 * | 7/2011 | Penner | F16G 5/18 474/215 |
| 8,057,342 | B2 * | 11/2011 | Junig | F16G 5/18 474/215 |
| 8,500,582 | B2 | 8/2013 | Triller et al. | |
| 2005/0209035 | A1 | 9/2005 | Oberle et al. | |
| 2006/0058142 | A1 * | 3/2006 | Hasebe | F16G 5/18 474/215 |
| 2007/0010363 | A1 | 1/2007 | Pichura et al. | |
| 2007/0093331 | A1 * | 4/2007 | Junig | F16G 5/18 474/215 |
| 2007/0142151 | A1 * | 6/2007 | Vornehm | F16G 5/18 474/215 |
| 2007/0238564 | A1 * | 10/2007 | Simonov | F16G 5/18 474/212 |
| 2009/0118042 | A1 | 5/2009 | Rothenbuhler et al. | |

FOREIGN PATENT DOCUMENTS

| | | |
|---|---|---|
| DE | 103 16 441 A1 | 11/2003 |
| DE | 10 2007 023 264 A1 | 12/2007 |
| EP | 1 900 966 A1 | 3/2008 |
| GB | 2 231 934 A | 11/1990 |
| JP | H05312238 A | 11/1993 |
| WO | WO 2006/058529 A1 | 6/2006 |

OTHER PUBLICATIONS

Translation of the Written Opinion of the International Searching Authority, dated Jun. 16, 2015, issued in Application No. PCT/DE2013/200316.

Japan Office Action; 4 pgs; dated Oct. 16, 2017 by Japan Patent Department.

* cited by examiner

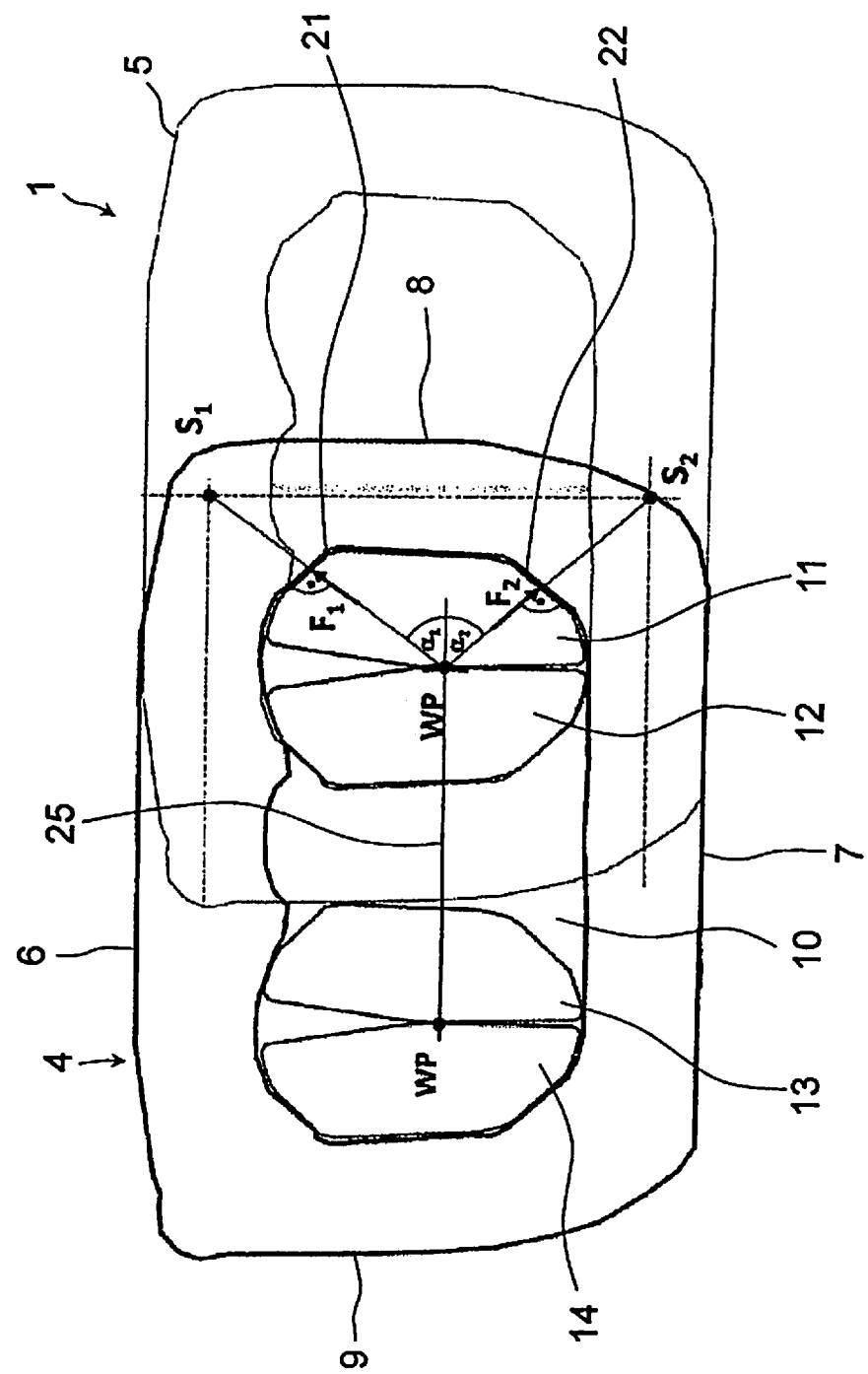

PLATE-LINK CHAIN

CROSS-REFERENCE TO RELATED APPLICATION

This application is the U.S. national phase application under 35 U.S.C. § 371 of International Application Serial No. PCT/DE2013/200316, having an international filing date of 21 Nov. 2013, and designating the United States, which claims priority based upon German Patent Application No. DE 10 2012 222 833.0, filed on 12 Dec. 2012, the entire contents of each of which applications are hereby incorporated by reference herein to the same extent as if fully rewritten.

BACKGROUND OF THE INVENTION

Field of the Invention

The present invention relates to a plate-link chain, in particular for a continuously variable transmission of a motor vehicle, having plate links which are connected to each other in an articulated manner by pairs of rocker pressure members, each including two rocker pressure members. In addition, the invention relates to a method for designing plate links and rocker pressure members of such a plate-link chain.

From German published application DE 34 13 384 A1, a plate-link chain for continuously variable, conical-pulley transmissions is known. The known plate-link chain includes plate links, and joint pieces that connect the chain links. The joint pieces are in the form of rocker members that are inserted into openings in the plate links, and are also known as rocker pressure members. The joint pieces have a concave rocking surface on both sides, which rocking surface is in contact with a convex rocking surface of radial end members of the plate links.

From German published application DE 10 2007 023 264 A1, a plate-link chain is known having a large number of link plates connected with each other in an articulated manner via pressure members. The pressure members run transversely to the longitudinal direction of the plate-link chain of the connected link plates and are positioned in openings of the link plates. There are curved mating surfaces located on each of the rocker members and link plates, along which mating surfaces the pressure members of the link plates bear against each other to transmit force. The mating surfaces are provided on the upper and lower contact surface area in the rocker member height direction between the rocker member and the link plate, and curved rolling surfaces are situated on the rocker members, along which the rocker members roll on each other to transmit force. In a cross section plane running in the longitudinal direction of the plate-link chain through a center of mass of the rocker member, the rolling surfaces extend into an upper area above the plane of the cross section and a lower area below it.

An object of the invention is to further improve a plate-link chain, in particular with regard to its service life and/or its strength.

SUMMARY OF THE INVENTION

The object is achieved in the case of a plate-link chain, in particular for a continuously variable transmission of a motor vehicle, having plate links which are connected to each other in an articulated manner by pairs of rocker pressure members, each having two rocker pressure pieces. The plate links and the rocker pressure members are designed in such a way to bear against each other so that the load on plate-link bands of the plate links is nearly torque-free during operation of the plate-link chain. The rocker pressure members of a rocker pressure member pair bear against each other in a rolling region. The middle of that rolling region represents, for example, a design-relevant pitch point. Depending on the loads that occur in operation, the design-relevant pitch point can also be located elsewhere. In addition, the rocker pressure members bear on plate-link bows of the plate link. In conjunction with the present invention, it has been found that when operating conventional plate-link chains, high stress gradients occur in all four bands that define the plate links, and thus result in stress peaks that are caused by high bending moments in the plate-link bands. That limits the tensile strength of the plate-link chains, and thus of the torque range. In the event of failure, the plate-link chains fail during strength tests due to breakage of the plate links at the places with high stress peaks. The torque-free plate-link bands of the plate-link chain in accordance with the present invention enables significantly greater tensile forces to be transmitted than with conventional plate-link chains.

A preferred exemplary embodiment of the plate-link chain is characterized in that defined contact surfaces are provided between the rocker pressure members and the plate links. In conventional plate-link chains, the contact areas between the rocker pressure members and the plate links are over-determined. The effective direction of force is therefore extremely tolerance-dependent. Due to the defined contact surfaces between the rocker pressure members and the plate links, the contact areas between the rocker members and the plate links are clearly prescribed.

Another preferred exemplary embodiment of the plate-link chain is characterized in that the plate links have flat mating surfaces for the rocker pressure members in the band connection areas. In the band connection areas, the upper/lower bands of a plate link are connected to the lateral bands of the plate link.

Another preferred exemplary embodiment of the plate-link chain is characterized in that the rocker pressure members have flat mating surfaces, with which the rocker pressure members bear against the flat mating surfaces of the plate links. That clearly establishes the application lines of forces which occur between the rocker pressure members and the plate links during operation.

Another preferred exemplary embodiment of the plate-link chain is characterized in that application lines of forces that occur between the rocker pressure members and the plate links during operation of the plate-link chain extend from a pitch point between the rocker pressure members of a pair of rocker pressure members to a nearby point of intersection of the neutral filaments of two plate-link bands. Neutral filament is the term for the region of a band cross section whose length does not change during a bending process. The bending stress is zero there.

Another preferred exemplary embodiment of the plate-link chain is characterized in that the application lines of the forces that occur between the rocker pressure members and the plate links during operation of the plate-link chain extend through the defined contact surfaces between the rocker pressure members and the plate links. The application lines of the forces thus extend from the pitch point through one of the defined contact surfaces to an intersection point of the neutral filaments.

Another preferred exemplary embodiment of the plate-link chain is characterized in that the application lines of the forces that occur between the rocker pressure members and the plate links during operation of the plate-link chain are positioned essentially at right angles to the defined contact surfaces between the rocker pressure members and the plate links. The angle between the force application lines and the contact surfaces is preferably ninety degrees plus or minus ten degrees.

In a method for designing the plate links and rocker pressure members of a plate-link chain as described above, the object indicated above is achieved alternatively, or additionally, by the plate links and rocker pressure members being designed and assembled in such a way that the load on the plate-link bands of the plate links is nearly torque-free during operation of the plate-link chain. That enables significantly greater tensile forces to be transmitted than with conventional plate-link chains.

A preferred exemplary embodiment of the method is characterized by at least one, a plurality of, or all of the following steps. First: defining the band width of transverse and longitudinal bands of a plate link; the upper and lower bands of a plate link are preferably referred to as longitudinal bands; the lateral bands are preferably referred to as transverse bands. Second: entering the neutral filaments of all four bands of a plate link; that yields the points of intersection of the neutral filaments. Third: ascertaining a rolling region of the rocker pressure members with a pitch point; the rolling region of the rocker members is obtained from a straight strand to a minimum running radius of the chain; the middle of the rolling region corresponds, for example, to a design-relevant pitch point. Fourth: aligning the contact surfaces between the rocker pressure members and the plate links; force vectors at the contact locations or contact surfaces of a fixed rocker pressure member to the corresponding plate link should ideally lie on a connecting line from the pitch point to one of the points of intersection of the neutral filaments. The contact surfaces between the rocker pressure member and the plate link must therefore be oriented essentially perpendicular to that force vector. That results in significantly lower bending moments than with conventional plate-link chains. The contact region between the rocker joint and the plate link can also be curved, if there is assurance that the resulting over-determination of the contact area does not result in any serious tolerances for the force directions or angles.

In addition, the invention relates to a plate link and/or a rocker pressure member for a plate-link chain as described above. The plate link and/or the rocker pressure member can be marketed separately.

In addition, the invention can relate to a chain-driven conical-pulley transmission having a previously described plate-link chain. The chain-driven conical-pulley transmission is also referred to as a CVT, or continuously-variable transmission.

BRIEF DESCRIPTION OF THE DRAWING

Additional advantages, features, and details of the invention can be seen from the following description in which various exemplary embodiments are described in detail with reference to the drawing.

FIG. 1 shows a side view of a portion of a plate-link chain in accordance with the present invention.

DESCRIPTION OF THE PREFERRED EMBODIMENTS

The accompanying FIGURE shows a portion of a plate-link chain 1 with two plate links 4 and 5. Plate link 4 includes an upper band 6 and a lower band 7. The two bands 6 and 7 are also referred to as longitudinal bands, and are connected at their longitudinal ends to ends of respective ones of two lateral bands 8, 9, which are also referred to as transverse bands.

Plate link 4 includes an opening 10, within which a total of four rocker pressure members 11, 12, 13, 14 are engaged. Rocker pressure members 11 and 12 constitute a first pair of rocker pressure members. Rocker pressure members 13 and 14 constitute a second pair of rocker pressure members. The first pair of rocker pressure members, with rocker pressure members 11 and 12, constitutes a first rocker joint, which couples the two plate links 4 and 5 with each other.

The rocker pressure members 11, 12 and 13, 14 of a rocker pressure member pair bear against each other in rolling regions. In the illustrated exemplary embodiment, a pitch point WP is situated in the middle of the rolling regions. On each of the rocker pressure member 11 and on a band connecting area which connects the upper band 6 with the lateral band 8, a first flat contact surface 21 is formed. A second flat contact surface 22 is formed on each of the rocker pressure member 11 and on a band connecting area which connects the lower band 7 with the lateral band 8.

The flat contact surfaces 21 and 22 constitute defined mating surfaces between the rocker pressure member 11 and the plate link 4. An application line of a contact force $F_1$ runs through the pitch point WP of the rocker pressure members 11, 12 and to an intersection point $S_1$ of neutral stress filaments, or neutral axes, of the bands 6, 8 of the plate link 4, which stress filaments are indicated by dashed lines. An application line of a contact force $F_2$ runs through the pitch point WP of the rocker pressure members 11,12 and an intersection point $S_2$ of neutral stress filaments of the bands 7, 8 of the plate link 4.

The application line of the contact force $F_1$ runs through the first contact surface 21 and is perpendicular to it. The application line of the contact force $F_2$ runs through the second contact surface 22 and is perpendicular to it. An angle between a horizontal line 25 that extends through the pitch points WP of the rocker member pairs and the application line of the contact force $F_1$ is identified as $\alpha_1$. An angle between the horizontal line 25 and the application line of the contact force $F_2$ is identified as $\alpha_2$.

Through the arrangement and design of the contact surfaces 21, 22 in accordance with the invention, a radial force component at the contact surfaces 21 and 22 between the rocker pressure members 11, 12 and the plate links 4, 5 can be increased so that the contact force vector $F_1$ or $F_2$ falls on the connecting line between pitch point WP and intersection point $S_1$ or $S_2$ of the neutral filaments of the bands.

That provides the benefit that with a prescribed torque capacity, the size of the plate-link chain 1 can be reduced. That improves the acoustic properties and also achieves a greater transmission ratio spread. Alternatively, or additionally, the width of the plate-link chain 1 can be reduced, enabling the manufacturing costs to be lowered. Furthermore, the mass of the plate-link chain 1 can be reduced.

When designing the plate link 1 in accordance with the present invention, the band widths of the transverse bands 8, 9 and of the longitudinal bands 6, 7 are first defined. Then the neutral filaments are entered. When the thickness of the bands 6 through 9 is constant, the neutral filaments are in the middle of the bands. Then the intersection points $S_1$, $S_2$ of the neutral filaments are identified.

After that, the rolling region of contact of the rocker pressure members 11, 12 is ascertained, which is derived from a straight strand condition to a minimum running radius of the plate-link chain 1. The middle of the rolling region corresponds to the pitch point WP in the illustrated exemplary embodiment.

The contact force vectors $F_1$ and $F_2$ at the contact points of the fixed rocker pressure member 11 with the plate link 4 should ideally lie on the connecting lines from the pitch point WP to the intersection points $S_1$ and $S_2$. The contact surfaces 21, 22 between the rocker pressure member 11 and the plate link 4 must therefore be oriented perpendicular, or at an angle of ninety degrees plus/minus ten degrees to the contact force vectors $F_1$ or $F_2$. That results in significantly lower bending moments applied to the plate links than in conventional plate-link chains.

What is claimed is:

1. A plate-link chain for a motor vehicle comprising:
   a first plate-link comprising:
      first and second longitudinal bands comprising first and second neutral axes, respectively;
      first and second lateral bands comprising third and fourth neutral axes, respectively;
      a first intersection point where the first neutral axis crosses the third neutral axis;
      an opening; and,
      a first flat contact surface in a first contact area between the first longitudinal band and the first lateral band;
   first and second rocker pressure members disposed in the opening and comprising respective convex surfaces bearing against one another at a first rolling region, the first rocker pressure member comprising a second flat contact surface parallel to and in contact with the first flat contact surface; and,
   a first pitch point situated in the first rolling region, wherein a first imaginary line drawn from the first pitch point to the first intersection point is normal to the first flat contact surface.

2. The plate-link chain of claim 1 wherein the first pitch point is in the middle of the first rolling region.

3. The plate-link chain of claim 1 wherein the first and second rocker members have the same shape.

4. The plate-link chain of claim 1 wherein:
   the first plate-link comprises:
      a second intersection point where the second neutral axis crosses the third neutral axis; and,
      a third flat contact surface in a second contact area between the second longitudinal band and the first lateral band;
   the first rocker pressure member comprises a fourth flat contact surface parallel to and in contact with the second flat contact surface; and,
   a second imaginary line drawn from the first pitch point to the second intersection point is normal to the second flat contact surface.

5. The plate-link chain of claim 4 further comprising:
   a second plate-link comprising:
      third and fourth longitudinal bands comprising fifth and sixth neutral axes, respectively;
      third and fourth lateral bands comprising seventh and eighth neutral axes, respectively;
      a third intersection point where the fifth neutral axis crosses the seventh neutral axis;
      an opening; and,
      a fifth flat contact surface in a third contact area between the third longitudinal band and the third lateral band, wherein:
         the second rocker pressure member comprises a sixth flat contact surface parallel to and in contact with the fifth flat contact surface; and,
         a third imaginary line drawn from the first pitch point to the third intersection point is normal to the fifth flat contact surface.

6. The plate-link chain of claim 5 wherein the first plate-link and the second plate-link have the same shape.

7. The plate-link chain of claim 5 wherein:
   the second plate-link comprises:
      a fourth intersection point where the sixth neutral axis crosses the seventh neutral axis; and,
      a seventh flat contact surface in a fourth contact area between the fourth longitudinal band and the third lateral band, wherein:
         the second rocker pressure member comprises an eighth flat contact surface parallel to and in contact with the seventh flat contact surface; and,
         a fourth imaginary line drawn from the first pitch point to the fourth intersection point is normal to the seventh flat contact surface.

8. The plate-link chain of claim 7 further comprising:
   an axis extending through the first pitch point and normal to the first longitudinal band; and,
   a second first plate-link, wherein the second plate link is disposed axially between the first plate-link and the second first plate-link.

9. The plate-link chain of claim 7 wherein the first and second rocker pressure members form a rocker joint that joins the first plate-link and the second plate-link in an articulating manner.

10. The plate-link chain of claim 9 comprising a plurality of plate-links joined by a plurality of rocker joints.

11. The plate-link chain of claim 1 further comprising:
    third and fourth rocker pressure members disposed in the opening and bearing against one another at a second rolling region; and,
    a second pitch point situated in the second rolling region, wherein:
       the first plate-link comprises:
          a fifth intersection point where the first neutral axis crosses the fourth neutral axis; and,
          a ninth flat contact surface in a fifth contact area between the first longitudinal band and the second lateral band;
       the third rocker pressure member comprises a tenth flat contact surface parallel to and in contact with the ninth flat contact surface; and,
       a fifth imaginary line drawn from the second pitch point to the fifth intersection point is normal to the ninth flat contact surface.

12. The plate-link chain of claim 11 wherein the second pitch point is in the middle of the second rolling region.

13. The plate-link chain of claim 11 wherein the third and fourth rocker members have the same shape.

14. The plate-link chain of claim 13 wherein the first, second, third, and fourth rocker members have the same shape.

15. The plate-link chain of claim 11 wherein:
    the first plate-link comprises:
       a sixth intersection point where the second neutral axis crosses the fourth neutral axis; and,
       an eleventh flat contact surface in a sixth contact area between the second longitudinal band and the second lateral band;

the third rocker pressure member comprises a twelfth flat contact surface parallel to and in contact with the eleventh flat contact surface; and, a sixth imaginary line drawn from the second pitch point to the sixth intersection point is normal to the eleventh flat contact surface.

* * * * *